United States Patent Office 3,517,151
Patented June 23, 1970

3,517,151
HEAT STORAGE
Matthew Mekjean, Niagara Falls, N.Y., assignor to Hooker Chemical Corporation, Niagara Falls, N.Y., a corporation of New York
Continuation-in-part of application Ser. No. 589,764, Oct. 26, 1966. This application Sept. 3, 1968, Ser. No. 757,012
Int. Cl. H05b 5/100, 1/00
U.S. Cl. 219—10.49                                  7 Claims

ABSTRACT OF THE DISCLOSURE

Induction heating devices may be advantageously employed to fill heat storage modules with storage compositions which may be melted by heat generated in the metal container walls. Furthermore, induction heating of filled modules in operation as heat storage units presents decided advantages over electrical resistance heaters for introducing heat into solid, liquid and mixed solid-liquid heat storage materials.

Modules which contain heat storage compositions which may become contaminated by water or carbon dioxide from the atmosphere such as alkali metal hydroxide containing composition may be protected from the atmospheric contaminants by providing a sealed-in atmosphere for one or several manifolded storage vessels via a fluid piston vent sealing means, the fluid of which separates the atmosphere from an expansion space provided in each storage module.

Heat storage modules may be internally aluminized and externally aluminized and/or phosphatized to afford a corrosion resistant module wall both towards the heat storage material and the external atmosphere.

---

This application is a continuation-in-part of application S.N. 589,764, filed Oct. 26, 1966, now Pat. No. 3,400,249.

This invention relates to the field of heat storage. Recent developments in the heat storage field have provided processes, compositions, and apparatuses for the storage of relatively large amounts of heat in a relatively small area. The concept of heat storage itself is somewhat unusual in the sense that it embodies the principles of recovering heat that would otherwise be lost or converting excess electrical power into heat and storing it for subsequent use. It is imperative for a successful heat storage application that the storage vehicle be capable of holding relatively large amounts of heat in a relatively small area for a long period of time. Furthermore, it is extremely important to a successful heat storage system that the system provide for withdrawal of stored heat on demand in the quantity and at the rate desired. In many applications it is particularly desirable that means be available for withdrawing stored heat at a rate and quantity which, in many instances, is substantially greater than the rate at which heat was initially introduced for storage in the heat storage medium.

Ultimate uses for heat which has been stored in a heat storage material are found in the generation of steam for the operation of steam turbines, steam engines, and even for generation of electricity. Likewise, stored heat finds great utility in the field of fluid heating and space heating such as in the domestic, commercial and industrial heating of water, particularly where the demand for hot water is extremely high during certain periods of the day. Previous methods of providing heated water required extremely large storage tanks for holding the water. By the use of a suitable heat storage medium, an equal amount of heat can be stored in a volume up to about 1/10 or less than that required to store heated water. Hence, in the field of water heating alone the substitution of a heat storage unit having a volume of approximately 60 cubic feet may be used to displace a water holding tank of 600 cubic feet capacity. The application of hot water generation to radiant heat for space, for direct usage of hot water and for subsequent heat exchange to another body represent especially important facts of heat storage utility.

The heat storage art has developed quite extensively in the sense that many heat storage mediums have been employed with mixed success. Some unique heat storage materials which have recently been developed include the operable systems using alkali metal hydroxide compositions. The substantially anhydrous alkali metal hydroxide heat storage materials form the basis for copending application S.N. 636,544, filed May 5, 1967, now abandoned. These compositions comprise a major amount by weight of an alkali metal hydroxide and a minor amount by weight of one or more additives which produce special effects such as corrosion inhibition, melting point changes, creakless or noisless mixtures, increased stability, improved heat conduction and the like.

The corrosion inhibitor additives found to be the most effective in fused alkali metal hydroxide compositions fully exposed to the atmosphere are the alkali metal nitrates. The vessel containing the alkali metal hydroxide heat storage composition is most desirably closed from the atmosphere. When the atmosphere, containing oxygen, is partially or completely excluded from a vessel housing an alkali metal hydroxide-alkali metal nitrate mixture, the corrosion of the container rapidly increases, the inhibitor action of the nitrate being offset by the reduction of nitrate by iron in the container as follows.

$$NaNO_3 \rightarrow NaNO_2 \rightarrow Na_2O$$

Sodium oxide is extremely reactive with the iron of a steel container and actually accelerates the attack upon the container wall. Hence, to fully exploit the superior corrosion ability of alkali metal nitrates as corrosion inhibitor it is necessary to add a stabilizing agent to prevent reduction of the nitrate.

Stabilizing agents which have been found to support the corrosion inhibition properties of the alkali metal nitrate are such compounds as the alkali metal and alkaline earth metal chromates, dichromates, manganates, permanganates, $MnO_2$, $TiO_2$, ferrites and similar substances. Of these the preferred stabilizing agent is $MnO_2$.

Co-additives for the alkali metal hydroxide heat storage material which may be effectively employed to reduce the melting point of the composition (lower the slush range) without otherwise presenting any deleterious effects are the alkali metal and alkaline earth metal halides, carbonates, sulfates, silicates, stannates, fluosilicates, fluoborates, tetraborates, metaborates, aluminates, bismuthates, iodates, borates, molybdates, tungstates, vanadates and mixtures thereof.

Certain of these co-additives are of special importance because they provide creakless mixtures when combined with the alkali metal hydroxide heat storage material. These co-additives are preferred and are the alkali metal and alkaline earth metal carbonates, phosphates and chromates.

The alkali metal hydroxide heat storage compositions are employed to store heat at an operable range generally lying between 300° F. and as high as 1200° F. At the upper end of this temperature range all of the alkali metal hydroxide compositions are in the molten state. However, it is not necessary in many applications to employ a heat storage material which passes into a molten state. Many heat storage materials are solids in the desired storage temperature range of a solid-liquid mixture. Among the solid storage mediums that form a part of the instant invention are the Group VIII metals, their major alloys, mixtures of the Group VIII metals, their common ores, and their common compounds. The relative applicability and various members of this broad class of heat storage materials are presented below in conjunction with their volumetric heat capacities. By volumetric heat capacity (VHC) it is intended to embrace the heat storage capacity of a given substance by unit volume. Hence, the dimensions of volume heat capacity may be expressed as calories per volume per degree centigrade wherein the volume is given in cubic centimeters. This value can be readily converted to B.t.u.'s per cubic foot per degree Fahrenheit via the conversion factor 62.36.

TABLE I

| Compound (name) | Formula | Volumetric heat capacity, gram-calorie /cc./° C. |
|---|---|---|
| Cast iron | Fe | 0.782 |
| Steel | Fe | 0.864 |
| Ferric oxide | $Fe_2O_3$ | 0.782 |
| Ferroso-ferric oxide | $Fe_3O_4$ | 0.777 |
| Ferrous oxide | FeO | 0.81 |
| Iron phosphide | $Fe_2P$ | 0.717 |
| Iron silicide | FeSi | 0.727 |
| Ferro-aluminum 80-20 | $Fe_2Al$ | 0.845 |
| Ferro-chromium 50-50 | FeCr | 0.794 |
| Ferro-nickel 74-25 | $Fe_3Ni$ | 0.887 |
| Ferro-manganese 50-50 | FeMn | 0.844 |
| Iron carbide | $Fe_3C$ | 0.842 |
| Iron boride | FeB | 0.954 |
| Ferric phosphate | $FePO_4 \cdot 2H_2O$ | 0.688 |
| Do | $FePO_4 \cdot 4H_2O$ | 0.715 |
| Ferric sulfide | $Fe_2S_3$ | 0.591 |
| Ferroso-ferric sulfide | $Fe_3S_4$ | 0.618 |
| Ferrous fluoride | $FeF_2 \cdot 8H_2O$ (-8$H_2O$ at 100° C.) | |
| Ferrous fluoride (anhy) | $FeF_2$ | 0.812 |
| Ferrous hydroxide | $Fe(OH)_2$ | 0.711 |
| Ferrous iodide | $FeI \cdot 4H_2O$ | 0.434 |
| Ferrous phosphate | $Fe_3(PO_4)_2 \cdot 8H_2O$ | 0.671 |
| Ferrous silicate | $FeSiO_3$ | 0.584 |
| Ferrous sulfate | $FeSO_4 \cdot 5H_2O$ (-5$H_2O$ at 300° C.) | 0.642 |
| Do | $FeSO_4 \cdot 7H_2O$ (-7$H_2O$ at 300° C.) | 0.600 |
| Ferrous sulfate (anhy) | $FeSO_4$ d. to FeO | 0.81 |
| Ferrous sulfide | FeS | 0.64 |
| Ferrous disulfide | $FeS_2$ | 0.723 |
| Iron-bearing minerals: | | |
| Ilmenite | $FeO \cdot TiO_2$ | 0.778 |
| Pseudobrookite | $Fe_2TiO_5$ | 0.752 |
| Hercynite | $FeO \cdot Al_2O_3$ | 0.791 |
| Actinolite | $Ca(Mg,Fe)_3(SiO_3)_4$ | 0.5875 |
| Anthophylite | $(Mg,Fe)SiO_3$ | 0.545 |
| Arizonite | $Fe_2O_3 \cdot 3TiO_2$ | 0.67 |
| Ceylonite | $(Mg,Fe)O \cdot (Al,Fe)_2O_3$ | 0.657 |
| Chlorotoid | $H_2(Fe,Mg) \cdot Al_2SiO_7$ | 0.814 |
| Chromite | $FeO \cdot Cr_2O_3$ | 0.688 |
| Cobalt pyrite | $(Fe,Co)S_2$ | 0.695 |
| Crocidolite | $Na_2O \cdot Fe_2O_3 \cdot 2FeO \cdot 6SiO_2$ | 0.591 |
| Epidote | $4CaO \cdot 3(Al,Fe)_2O_3 \cdot 6SiO_2 \cdot H_2O$ | 0.776 |
| Fayalite | $2FeO \cdot SiO_2$ | 0.713 |
| Ferberite | $FeWO_4$ | 0.664 |
| Almandite | $Fe_3Al_2(SiO_4)_3$ | 1.105 |
| Androlite | $Ca_3Fe_2(SiO_4)_3$ | 0.593 |
| Goethite | $Fe_2O_3 \cdot H_2O$ | 0.795 |
| Limonite | $Fe_2O_3 \cdot H_2O$ plus $Fe_2O_3$ | 0.646 |
| Melanterite | $FeSO_4 \cdot 7H_2O$ | 0.600 |
| Olivine | $2(Mg,Fe)O \cdot SiO_2$ | 0.840 |
| Pyrrhotite | $Fe_5S_6 \cdot Fe_{16}S_{17}$ | 0.615 |
| Siderite | $FeCO_3$ | 0.666 |
| Staurolite | $2FeO \cdot 5Al_2O_3 \cdot 4SiO_2 \cdot H_2O$ | 0.807 |
| Nickel | Ni | 0.941 |
| Nickel chloride | $NiCl_2$ | 0.510 |
| Nickel fluoride | $NiF_2$ | 0.896–0.90 |
| | $NiF_2 \cdot 5HF \cdot 6H_2O$ | 0.745 |
| Nickel mono-oxide | NiO | 1.028 |
| Nickel sesquioxide | $Ni_2O_3$ | 0.712 |
| Nickelous nickelic oxide | $Ni_3O_4$ | 0.925 |
| Do | $Ni_3O_4 \cdot 2H_2O$ | 0.64 |
| Nickel antimonide | NiSb | 0.531 |
| Nickel arsenide | NiAs | 0.703 |
| Do | $Ni_3As_2$ | 0.748 |
| Nickel boride | NiB | 0.946 |
| Nickel bromide | $NiBr_2$ | 0.395 |
| Nickelous iodide | $NiI_2$ | 0.347 |
| Nickelous nitrate | $Ni(NO_3)_2 \cdot 6H_2O$ (liquid above 56.7°C.) | 0.664 |
| Nickelous pyrophosphate | $Ni_2P_2O_7$ | 0.69 |
| Nickel phosphide | $Ni_3P_2$ | 0.74 |
| Nickel phosphide | $Ni_2P$ | 0.757 |
| Nickel selenide | NiSe | 0.762 |
| Nickel silicide | $Ni_2Si$ | 0.802 |
| Nickel silicofluoride | $NiSiF_6 \cdot 6H_2O$ | 0.675 |
| Nickelous sulfate | $NiSO_4$ | 0.656 |
| | $NiSO_4 \cdot 6H_2O$ | 0.624 |
| Nickelous monosulfide | NiS | 0.588 |
| Nickelous nickelic sulfide | $Ni_3S_4$ | 0.62 |
| Nickelous sulfite | $NiSO_3 \cdot 6H_2O$ decomp. to $NiO + SO_2$ | 1.028 |
| Cobalt | Co | 0.936 |
| Cobalt boride | CoB | 0.925 |
| Cobalt phosphide | $Co_2P$ | 0.766 |
| Cobalt silicide | CoSi | 0.724 |
| Cobalt sulfide | $CoS_2$ | 0.59 |
| Cobaltic oxide | $Co_2O_3$ | 0.762 |
| Cobaltic sulfide | $Co_2S_3$ | 0.641 |
| Cobaltous cobaltic oxide | $Co_3O_4$ | 0.872 |
| Cobaltous carbonate | $CoCO_3$ | 0.695 |
| Cobalt cobaltous fluoride | $CoF_2$ | 0.85 |
| Cobalt cobaltous hydroxide | $Co(OH)_2$ | 0.728 |
| Cobalt cobaltic chloride | $CoCl_3$ | 0.441 |
| Cobalt cobaltous bromide | $CoBr_2$ | 0.417 |
| Cobalt cobaltous chloride | $CoCl_2$ | 0.481 |
| Cobalt cobaltous iodide | $CoI_2$ | 0.338 |
| Cobalt cobaltous oxide | CoO | 0.803 |
| Cobalt cobaltous selenide | CoSe | 0.687 |

TABLE I.—Continued

| Compound (name) | Formula | Volumetric heat capacity, gram-calorie /cc./° C. |
|---|---|---|
| Cobalt cobaltous orthosilicate | $Co_2SiO_4$ | 0.71 |
| Cobalt cobaltous silicide | $Co_2Si$ | 0.788 |
| Cobalt cobaltous sulfate | $SoSO_4$ | 0.66 |
| | $CoSO_4 \cdot H_2O$ | 0.655 |
| | $CoSO_4 \cdot 7H_2O$ | 0.608 |
| Cobalt cobaltous sulfide | $CoS$ | 0.695 |
| Cobalt silicofluoride | $CoSiF_6 \cdot 6H_2O$ | 0.666 |
| Geuthite | $Mg_2Ni_2O_3 \cdot 3SiO_2 \cdot 6H_2O$ | 0.593 |
| Gersdoffite | $NiS_2 \cdot NiAs_2$ | 0.634 |
| Melonite | $NiTe_2$ | 0.433 |
| Millerite | $NiS$ | 0.703 |
| Niccolite | $NiAs$ | 0.70 |
| Polydymite | $Ni_3S_4$ | 0.613 |
| Safflorite | $CoAs_2+Fe, Ni$ | 0.632 |
| Zaratite | $NiCO_3 \cdot 2Ni(OH)_2 \cdot 4H_2O \rightarrow NiO$ | 1.028 |
| Cobaltite | $CoS_2 \cdot CoAs_2$ | 0.661 |
| Erythoite | $3CoO \cdot As_2O_5 \cdot 8H_2O$ | 0.62 |
| Glaucodot | $(Fe,Co)S_2 \cdot (Fe,Co)As_2$ | 0.68 |
| Linnaeite | $CoS \cdot Co_2S_3$ | 0.647 |
| Smaltite | Essentially $CoAs_2$ | 0.556 |

Solid heat storage materials excel in certain applications because of the ease with which storage units may be assembled, freedom from corrosion, and ease in handling. Individual units equipped with electrical resistance heating elements may be installed between studs or otherwise concealed in walls and flooring of buildings to provide direct space heating to air which is circulated into heat transfer relationship with the storage material and passed into the room to be heated. Thus direct heating of individual rooms within a home may be controlled without the need for elaborate control devices while driving heat initially from electrical energy which is supplied at a time when it is less costly than during the maximum consumption periods of the day. Furthermore, the solid heat storage materials may be centrally located and heat may be delivered to any desired site by a suitable heat transfer medium or heat duct. These advantages coupled with the greater freedom of design, greater safety (no leakage) and ease of fabrication (filling and empting heat storage units at the point of use whether in a home, industry or municipal installation) make solid heat storage materials particularly significant in the vast field of materials available for heat storage.

Solid heat storage media other than Group VIII metals, alloys, salts, compounds, minerals, ores, etc. which are abundant, inexpensive, safe, and exhibit a high volumetric heat capacity for the storage of heat in a properly designed system are:

TABLE II

| Compound name | Formula | Volumetric heat capacity, gram-calorie/ cc/° C. |
|---|---|---|
| Aluminum | $Al$ | 0.62 |
| Aluminum oxide | $Al_2O_3$ | 0.96 |
| Aluminum silicate | $Al_2SiO_5$ | 0.7225 |
| Barium fluoride | $BaF_2$ | 0.512 |
| Sulfate | $BaSO_4$ | 0.532 |
| Beryllium | $Be$ | 1.25 |
| Beryllium oxide | $BeO$ | 1.232 |
| Beryllium carbide | $Be_2C$ | 0.888 |
| Beryllium hydroxide | $Be(OH)_2$ | 0.87 |
| Beryllium fluoride | $BeF_2$ | 0.692 |
| Boron | $B$ | 0.624 |
| Carbide | $B_4C$ | 0.578 |
| Calcium fluoride | $CaF_2$ | 0.66 |
| Calcium phosphate | $Ca_3(PO_4)_2$ | 0.622 |
| Calcium silicate | $CaSiO_3$ | 0.55 |
| Aluminate | $Ca(AlO_2)_2$ | 0.72 |
| | $CaO \cdot Al_2O_3 \cdot 2SiO_2$ | 0.578 |
| | $CaCO_3$ | 0.54 |
| Cooper | $Cu$ | 0.87 |
| Copper oxide | $CuO$ | 0.825 |
| | $CuOH$ | 0.528 |
| Copper hydroxide | $Cu(OH)_2$ | 0.65 |
| Copper sulfate | $CuSO_4$ | 0.623 |
| Carbonate | $Cu_2CO_3$ | 0.617 |
| Lead fluoride | $PbF_2$ | 0.545 |
| Lead phosphate | $Pb_3(PO_4)_2$ | 0.537 |
| Lead silicate | $PbSiO_3$ | 0.505 |
| Lead sulfate | $PbSO_4$ | 0.564 |
| Molybdate | $PbMoO_4$ | 0.519 |
| Lithium (lig) | $Li$ | 0.542 |
| Lithium aluminate | $LiAlO_2$ | 0.79 |
| Lithium chloride | $LiCl$ | 0.61 |
| Lithium fluoride | $LiF$ | 1.093 |

TABLE II.—Continued

| Compound name | Formula | Volumetric heat capacity, gram-calorie/ cc/° C. |
|---|---|---|
| Lithium hydride | $LiH$ | 0.877 |
| Lithium hydroxide | $LiOH$ (solid) | 1.325 |
| | $LiOH$ (liquid) | 1.725 |
| Lithium oxide | $Li_2O$ | 1.104 |
| Lithium phosphate | $Li_3PO_4$ | 0.876 |
| Lithium silicate | $Li_2SiO_3$ | 0.79 |
| Lithium sulfate | $Li_2SO_4$ | 0.683 |
| Magnesium aluminate | $MgOAl_2O_3$ | 0.877 |
| Magnesium fluoride | $MgF_2$ | 0.8975 |
| Magnesium oxide | $MgO$ | 0.924 |
| Magnesium phosphate acid phosphate. | $Mg_3(PO_4)_2 \cdot 8H_2O$ | 0.770 |
| | $MgH(PO)_4 \cdot 7H_2O$ | 0.768 |
| | $Mg_3(PO_4)_2$ | 0.686 |
| | $MgHPO_4$ | 0.630 |
| | $Mg_3Si_4O_{11} \cdot H_2O$ | 0.610 |
| | $Mg_2P_2O_7$ | 0.597 |
| Manganese | $Mn$ | 0.813 |
| Manganese fluoride | $MnF_2$ | 0.695 |
| Manganese oxide | $MnO$ | 0.745 |
| Manganese caustic oxide | $Mn_3O_4$ | 0.713 |
| | $Mn_2P_2O_7$ | 0.670 |
| | $MnSiO_3$ | 0.585 |
| Lithium silicate | $Li_4SiO_4$ | 0.939 |
| Manganic oxide | $Mn_2O_3$ | 0.744 |
| Manganese dioxide | $MnO_2$ | 0.82 |
| Molybdenum | $Mo$ | 0.66 |
| Molybdenum dioxide | $MnO_2$ | 0.715 |
| | $MoO_3$ | 0.569 |
| Molybdenum carbide | $MoC$ | 0.627 |
| Potassium aluminate | $K_2(AlO_2)_2 \cdot 3H_2O$ | 0.607 |
| Potassium fluoride | $KF$ | 0.521 |
| Potassium sulfate | $K_2SO_4$ | 0.516 |
| Silicon | $Si$ | 0.531 |
| Silicon carbide | $SiC$ | 0.633 |
| Silicon dioxide | $SiO_2$ | 0.549 |
| Silver | $Ag$ | 0.604 |
| Slver carbonate | $Ag_2CO_3$ | 0.578 |
| Silver fluoride | $AgF$ | 0.574 |
| Silver oxide | $Ag_2O$ | 0.506 |
| Silver phosphate | $Ag_3PO_4$ | 0.61 |
| Silver pyrophosphate | $Ag_4P_2O_7$ | 0.557 |
| Silver sulfate | $Ag_2SO_4$ | 0.591 |
| Silver sulfide | $Ag_2S$ | 0.526 |
| Sodium aluminate | $NaAlO_2$ | 0.78 |
| Borate | $NaBO_2$ | 0.599 |
| Borax | $Na_2B_4O_7 \cdot 10H_2O$ | 0.623 |
| | $Na_2B_4O_7$ | 0.602 |
| Sodium carbonate | $Na_2CO_3$ | 0.626 |
| Sodium fluoride | $NaF$ | 0.823 |
| Sodium hydroxide (s) | $NaOH$ | 0.665(s) |
| Sodium hydroxide (l) | $NaOH$ | 0.907(l) |
| Phosphite | $NaPO_3$ | 0.566 |
| Tri sodium phosphate | $Na_3PO_4$ | 0.619 |
| Sodium pyrophosphate | $Na_4P_2O_7$ | 0.586 |
| Sodium sulfate | $Na_2SO_4$ | 0.642 |
| Sodium nitrate | $NaNO_3$(l) | 0.80(l) |
| | $NaNO_3$(s) | 0.647(s) |
| Sodium oxide | $Na_2O$ | 0.6 |
| Sodium silicate | $Na_2SiO_3$ | 0.532 |
| Sodium silicate | $Na_4SiO_4$ | 0.555 |
| Stannic oxide | $SnO_2$ | 0.66 |
| Stannic sulfate | $SnSO_4$ | 0.715-300 |
| Titanium | $Ti$ | 0.583 |
| Titanium carbide | $TiC$ | 0.566 |
| Titanium phosphide | $TiP$ | 0.582 |
| Titanium dioxide | $TiO_2$ | 0.756 |
| Water | $H_2O$ | [1] 0.867 |
| Zinc | $Zn$ | 0.677 |
| Zinc fluoride | $ZnF_2$ | 0.872 |
| Zinc oxide | $ZnO$ | 0.69 |
| Zinc phosphate | $Zn_3(PO_4)_2$ | 0.636 |
| Zinc sulfate | $ZnSO_4$ | 0.640 |
| Zinc silicate | $ZnSiO_3$ | 0.548 |
| Zirconium dioxide | $ZrO_2$ | 0.645 |
| Zirconium silicate | $ZrO_2 \cdot SiO_2$ | 0.561 |

[1] Mean to 100° C.

Although all the listed materials have acceptable volumetric heat storage capacities, some are especially desirable because of their availability, cheapness, high heat capacities, inertness, corrosion resistance, thermal stability, thermal conductivity, useable temperature range, or other advantageous features. For example, a comparison with water, an excellent universal heat storage material, may be made. The mean volumetric heat capacity of water is 0.867 gram calories per cubic centimeter per degree centigrade up to its boiling point. However, in practical applications, the use of water as a heat storage medium is severely limited by its small usable temperature range (100 degrees centigrade maximum) at atmospheric pressure. To be able to store large quantities of heat in water, an abnormally large volume of material would be required.

Furthermore, since economics play a major role in commercial applications of heat storage, the media with exceptionally high volumetric heat capacities may prove too expensive. This is true of such materials as lithium hydroxide, silver and beryllium which exhibit volumetric heat capacities of 1.325, 0.604 and 1.25, respectively. The cost of these materials eliminate them from consideration as practical heat storage media in all but the most vital applications in which expense is no consideration.

A specific heat storage medium may not be arbitrarily disregarded on the sole-basis of its volumetric heat capacity because other attributes of the material may overshadow the disadvantageous storage capacity attribute. For example, solid tin has a volumetric heat capacity of 0.382. Molten tin has a volumetric heat capacity of 0.458. Because of these relatively low heat capacities, tin might be considered upon cursory inspection to be a poor heat storage material. However, such analysis would ignore another very significant attribute of tin, which is its large liquidus range from a melting point of about 231.9 degrees centigrade to a boiling point of about 2,260 degrees centigrade. This broad liquid range (over 2000 centigrade degrees) makes tin an excellent heat storage material.

Since liquids are usually superior heat storage materials, molten tin would serve as an excellent storage medium alone or in a mixture with a solid material such as aluminum oxide which exhibits a volumetric heat capacity of 0.96. Since aluminum oxide is a poor heat conductor, but an excellent heat storage medium, the combination of aluminum oxide in tin provides heat storage attributes superior to those of either material used alone. The poor heat conductor ($Al_2O_3$) uses the tin to conduct heat in and out of the storage matrix; the low heat capacity of tin borrows the high heat capacity of the aluminum oxide. The overall effect is very satisfactory.

When considering a heat storage system in which solid heat storage materials are employed, one problem that must be kept in mind is that of filling of the heat storage module. Whenever a solid heat storage medium is employed in a flake or particulate form, 100% of the available space is not effective within the heat storage module. Voids exist between the solid particles. These voids lower the theoretical density of the solid material and consequently, lower the volumetric heat capacity of the medium under consideration. Hence, methods to essentially densify the solid material and increase its volumetric heat capacity are important considerations whenever a solid heat storage medium is being used.

This discrete combination of solids and liquids presents one method whereby the total heat capacity of a solid heat storage medium may be increased per unit volume. This aspect of the instant invention also provides an advantage over a totally solid heat storage medium by increasing the efficiency of transferring heat into and out of the solid portion of the mixed solid-liquid heat storage medium. Other exemplary solid-liquid combinations of special merit are either solid magnesium oxide or $Fe_3Al_2(SiO_4)_3$ in a liquid $NaNO_3$-$NaNO_2$ mixture. Furthermore, ferrophosphorus in sodium hydroxide or a mixture of sodium hydroxide and sodium nitrate will react to produce a dilute (low percentage of solids in the liquid medium) heat storage material. The resultant heat storage medium produced by the reaction of ferrophosphorus with sodium hydroxide is a mixture of sodium phosphate and $Fe_2O_3$.

$$Fe_2P + NaOH \rightarrow NaOH + Na_3PO_4 + Fe_2O_3$$

By varying the quantities of the reactants, a heat storage medium may be produced with predetermined specific percentage ranges of components. Hence, for example, $$Fe_2P + NaOH \rightarrow NaOH + Na_3PO_4 + Fe_2O_3$$
$$(5\text{--}15\%)$$

with simultaneous production of a corrosion inhibitor produced by saturating the system with $Fe_2O_3$ which would presumably be one of the corrosion products when a steel container is employed for the NaOH containing heat storage material.

Likewise, the resultant heat storage material derived from ferrophosphorus and a mixture of NaOH and $NaNO_3$ may be employed. Thus, $$Fe_2P + NaOH + NaNO_3 \rightarrow NaOH + NaNO_3 + Na_3PO_4 + Fe_2O_3$$

The amounts of the reactants may be optionally changed to afford heat storage compositions in which the proportion of $Fe_2O_3$ and $Na_3PO_4$ preponderate forming a heavy sludge or paste in which the NaOH and $NaNO_3$ appear in a minor proportion in liquid form to fill spaces between the solid materials. The new medium, a mixture of fine solids in a fused system can be considered to be a paste, a slurry, a dense solid (if it is a sludge), a mixture, a composite or a blend. The possible concentration or percentage distribution of the various ingredients will vary according to the amounts allowed to react in the first instance.

This concept of a solid-liquid mixture to be used as a heat storage material may be extended from the previously expressed concept of a reaction mixture to embrace a compounded mixture such as that directly derived from sodium hydroxide, sodium phosphate, sodium nitrate and $Fe_2O_3$.

The concept of a solid-liquid heat storage medium is not limited to reaction mixtures or mixtures of compounds as expressed in the preceding paragraphs but includes solid-liquid mixtures which would result from the use of solid metal particles, rods, coils, chips, wires, balls, cylinders, etc. in a liquid heat storage medium. For example, steel or cast iron in fused sodium hydroxide may be employed. Likewise, the solid heat storage materials listed in Table I and derived from the Group VIII metals may be added to a fused alkali metal hydroxide composition to produce an effective solid-liquid heat storage medium.

Other solid materials which may be incorporated in an otherwise liquid heat storage medium are copper, silver, aluminum, nickel, and iron.

When considering a solid-liquid heat storage medium it is to be understood that the liquid phase is not restricted to a molten salt. The liquid phase may be aqueous, non-aqueous (oils, organics, etc.), fused salts (essentially non-aqueous), molten metals (as liquids) and alloys, any of which may undergo the transition of solid-liquid-solid. The addition of solids to these systems create new heat storage mediums of greater value. Especially important advantages in these solid-liquid systems reside in better heat transfer, high heat capacity, lower cost, smaller volume, etc. The system created should be unreactive as a final system even though a reaction may occur in the initial creation of the heat storage material.

Examples of other solid-liquid heat storage compositions are cast iron in fused sodium nitrate, $Al_2O_3$ in a high temperature oil-fat, copper slabs in aqueous copper sulfate, stainless steel in molten tin or graphite in molten tin.

Of the heat storage materials disclosed above, the preferred materials of this invention are selected from the refractory compositions of Ni, Fe, Cu, Mn, Co, Mo, Ag, Zr, Zn, Ti, the alkali metals, the alkaline earth metals; the metals Ni, Cu, Mn, Co, Mo, Ag, Zn, Zr, Ti, and Si as well as their alloys, oxides, sulfides, and phosphides. The refractory compositions of these metals include the aluminates, silicates, carbides, borides and phosphides. Of especial significance are the ferro alloys containing at least one of the elements aluminum, nickel, manganese, titanium, chromium, molybdenum and silicon.

The most preferred heat storage materials are the oxides of Ni, Mg, Al, Cu, Fe, Mn, Co, Ti, Mo, Zn, Zr, Ca and Si; the sulfides of Fe and Ni, a mixture of Sn and $Al_2O_3$; the aluminates of Fe and Ca; the titanates of Fe; the phosphides of Fe and Ti; the fluorides of Mg, Mn, Ni, Zn, Fe and Co; the silicates of Al, Fe, Mg, Ca, Mn, Zr, Zn, Ni; the phosphates of Fe, Ca, Mg, and Zn; the borates of the alkali metals and alkaline earth metals; and mixtures thereof.

An additional and a very important attribute of a solid-liquid heat storage system resides in the elimination of cracking or pinging noises which occur in a cooling module as a molten sodium hydroxide containing heat storage material solidifies. This phenomenon is particularly noted in certain systems such as molten alkali metal hydroxides used in conjunction with a steel container. As an alkali metal hydroxide heat storage composition cools and begins to solidify, theoretically at the freezing point the liquid is losing heat isothermally (at a constant temperature). Although this may be correct for the alkali metal hydroxide material which is still in the liquid state it is not necessarily true for that portion of the material which has already become solid. Once the heat of fusion of the alkali metal hydroxide heat storage composition has all been transmitted to its surroundings, the entire mass is solid and crystalline but it is still losing heat and still shrinking. Every so often a steel container will "crack" or "ping" as a crystal-quake occurs. A sudden release of tension by the shearing of adjacent crystal planes is believed to cause this internal noise. The compressive pressure developed as the mass continues to cool and contract continues to create the crystal-quakes and the undesirable noises.

To avoid the occurrence of crystal-quakes, pings or cracking noises, solid particles in a molten salt heat storage system are particularly advantageous. The solid particles, preferably rods of metallic material which is chopped into an acceptable size, facilitate shearing or slippage of adjacent crystalline planes resulting in prevention or minimization of container distortion and objectionable noises.

If for instance, many more crystalline nuclei are developed in the earliest stages of cooling a molten alkali metal hydroxide heat storage composition than form in a homogeneous material, the entire pattern of the crystallization is converted to a disordered or disoriented unsymmetrical crystalline phase rather than the normal monoclinic crystalline structure. The solid material within the molten heat storage material creates many sites for nucleation of the crystallizing salt thereby creating disorder in an otherwise uniform mass. This provision for crystal slippage, created shear planes, disorients the shrinkage of salt and solid alike, without destroying the best features of the fluid heat storage medium at elevated temperatures. The solid material within the heat storage unit may advantageously present a catacomb system in which liquid and solid could exist to their mutual benefit where the liquid is free to flow in, around and over the solid material. This random, disarrayed pattern providing a greatly increased nucleation center for crystal formation must be composed of solid materials of such size that they do not resist the flow of molten fluid within the heat storage container. However, the solid substance must not be so large as to create large salt crystal masses on cooling which would not be of any benefit and would present the identical problem encountered with molten systems in the absence of solid material.

The liquid material which is to be used in conjunction with the solid should be safe, non-toxic, stable over the desired temperature range, inexpensive, exhibit little or no corrosion, exhibit high volumetric heat capacity and have high thermal conductivity (be a poor insulator), be readily and universally available, and exhibit a heat of fusion storage nature if it passes into a molten state. Ideally the liquid phase would be non-crystalline because crystallized materials present tremendous pressures as they pass into the crystalline state. This tremendous pressure of course assists in creating or creates distortion problems in the container vessel. If the liquid phase is composed of a material which is crystalline it should be of the type which freezes or crystallizes into disoriented patterns of a random or directionless nature which would create very weak pressure on the container itself. The differential linear coefficient of expansion and contraction exhiibted by an alkali metal hydroxide heat storage composition such as those disclosed in copending application Ser. No. 636,544 toward mild steel is great enough to create distortion of the module. In addition to this is the fact that the bonding strength of the salt to steel is as much as 400 lbs. per sq. inch. Hence, certain steps may be taken to change the composition of the salt to reduce its bonding strength to steel and to avoid the noise problem and structural stress in the storage vessel.

Of purely liquid heat storage materials, to date, probably the most highly developed or suitable liquid system is that disclosed in copending application S.N. 636,544 based upon the heat of fusion principle. The heat storage compositions therein disclosed are under normal operating conditions in the liquid or molten phase. However, during certain phases of a normal heat storage-removal cycle the alkali metal hydroxide compositions may be in a solid-liquid phase or may be likened to a slurry or paste. For the purposes of this case however the alkali metal hydroxide heat storage compositions of copending application S.N. 636,544 are considered liquid systems.

A combination of these heat storage materials may be integrated into one heat storage system for special purposes. For example, a module containing a liquid heat storage material and a module containing a solid heat storage material may be combined as separate units to provide quite drastically different heat delivery rates and quantities. The separate units may be connected in series or parallel with manifold means where appropriate.

An important consideration in conjunction with the type of heat storage material to be used in any given system is the device used for heating or the method for introducing heat into the heat storage material. For example electrical resistance heaters have been found to be very advantageously employed with the alkali metal hydroxide heat storage compositions of copending application S.N. 636,544. However, solar heat, heats of reaction, such as that found in the combustion fuels or that often wasted in chemical reactions may be employed. Likewise, heat wasted in many industrial operations may be captured and stored in suitable heat storage materials. An especially advantageous heating device which may be used in conjunction with solid, solid-liquid or liquid heat storage materials is the induction heater. By induction heating, it is intended to embrace those heating devices which create an eddy current in an electric conductor when it is subjected to a magnetic field. The current flowing through the conductor produces heat via $I^2R$ losses. The magnetic field is produced by a coil carrying an alternating current of suitable frequency. Frequencies used range from 25–1,000,000 cycles per second. The depth of heating varies inversely with the square root of the frequency. The amount of power transferred from the coil to the workpiece increases in proportion to the square root of the frequency. Thus, by limiting the depth of penetration with higher frequencies, a higher heat is obtained faster and heating may be confined to the surface of the work. Magnetic materials heat more readily than non-magnetic ones and materials of high resistivity heat faster than those with lower resistivity. Temperatures may be achieved up to and around 3,000 degrees centigrade by induction heaters.

The coil conductors are usually hollow to permit the flow of water coolant through the conductor although this is not always necessary. Deep heat penetration causes melting if desired in the range between 60 to 10,000 cycles per second. Usually to achieve this frequency, a motor-generator set may be employed which will create frequencies as high as 9,600 cycles per second or an electronic oscillator may be used to achieve considerably higher frequencies.

Electric power is converted into heat by induction through strong magnetic fields at low frequencies (60 cycles or less) or weak magnetic fields at high frequencies (360 to 2000 cycles per second and higher). The strong magnetic field (low frequency current) requires interlinkage of an iron core with the coil and with a soap or ring of the material to be heated in the same manner as the core, primary and secondary of a transformer. The use of high-frequency current makes it possible to dispense entirely with the iron core and eliminates the necessity of looping the conductor which is to be heated. The same amount of heat may be created with a field of unit strength and 6000 cycles per second as with a field 100 times as strong at 60 cycles per second.

Induction heaters, such as those known to the art as the loop or coil type, may be used to introduce heat into solid, solid-liquid and liquid heat storage materials. The frequencies generated in the induction heater will be varied with the substance to be heated. They are very advantageously employed during the module filling state where a heat storage material such as an alkali metal hydroxide containing composition is involved as well as the heating source during operation of a module.

The alkali metal hydroxide heat storage compositions previously discussed form an extremely tenacious adhesive bond to a steel container. During any heat withdrawal cycle or the initial module filling procedure, as the heat storage material cools, the steel container may be inwardly distorted. The distortion of the module walls is also caused by stresses set up within the system as it cools due to the differential coefficient of expansion between the heat storage medium and the steel vessel. These stresses may be primarily due to the fact that this is a non-uniform cooling in the system. In any event, repeated flexure of the metal container, especially a steel container of as low as 16 gauge steel, produces premature failure via metal fatigue and is especially harmful at any welded joints in the storage container.

By employing induction heating, a heat storage composition may be very rapidly brought up to a desired temperature. In comparison, electrical resistance heaters are much slower. Furthermore, induction heaters may be employed as auxiliary heaters in conjunction with electrical resistance heaters. The induction heater may be used to melt an escape channel for a heat storage composition which operates from a solid state to a melt or fused state. In this sense, the induction heater may be initially energized to melt the heat storage composition at the sides of the storage container and adjacent to any magnetic material in contact with the heat storage composition such as an internal heat transfer conduit or the electrical resistance heater itself. Since the coil of an induction heater is conventionally water cooled, the induction coil may be advantageously used as a preheater for water which is subsequently passed in heat transfer relationship with the heat storage material. Air may be heated by the same apparatus by merely conducting it through or over the module in heat exchange relationship, thereby providing a complete water and air heating arrangement.

Through induction heating, an empty module may be brought up to above the temperature of the molten alkali metal hydroxide heat storage composition. The molten heat storage composition may then be poured easily into the module and the entire assembly slowly cooled. Likewise, solid alkali metal hydroxide heat storage compositions may be introduced into the module in any suitable form as flakes, pellets or crystalline mass. The storage material is melted and the entire assembly is slowly cooled from the inside outwardly so that a sheath of molten material remains around the outside surface of the mass until complete solidification occurs. Although radiant tunnels using electric heating may be used by slowly advancing a chain of modules from the cool to the hot end, this method is slow. The preferred method of filling modules is to employ an introduction furnace whereby heating is almost instantaneous and uniform throughout the mass, producing substantially no thermal gradient. Likewise, during any subsequent heating cycle, by induction heating, a sheath of molten material forms at the metal container-alkali metal hydroxide interface first, allowing the storage material to expand into the expansion space at the top of the module without producing undesirable adverse expansive forces on the module walls.

Hence, induction heaters present advantages over more conventional heating devices in that the heater need not contact a corrosive storage material such as an alkali metal hydroxide composition. The induction heaters provide a uniform heating and cooling rate which prevents distortion of the container for the heat storage material, by melting the heat storage material at the internal container wall initially to allow molten storage material to expand into the expansion space at the top of the module, and by uniformly cooling the heat storage material to prevent adhesion by the storage material to the container surface.

Another important aspect of the instant invention resides in a solution to the problem of contamination of certain heat storage materials by substances in the atmosphere which are introduced into a heat storage module as a consequence of a heat storage-withdrawal cycle whereby the heat storage material expands and contracts. This problem of contamination is especially important when using heat storage compositions which will react with a component of the air such as oxygen, carbon dioxide, water, etc. In this connection, breathing devices have been developed in the past which incorporates desiccants to capture water and other devices to remove the carbon dioxide from the air. However, a very advantageous system which avoids contamination of the heat storage material from the atmosphere all together is that of a fluid piston. A fluid piston when used in conjunction with a heat storage material as an apparatus adjunct to the heat storage module itself, creates a completely closed system. The fluid piston in essence comprises a device which will equilibrate the pressure within a sealed heat storage unit by means of raising or lowering a fluid within a pipe. One side of the fluid being exposed to the gases within the expansion space of the heat storage module. This concept of a fluid piston may also be employed in a heat storage system to provide a uniform pressure on the conduit housing a heat transfer fluid, if desired.

In operation, during the heating cycle of a heat storage material which expands greatly such as the alkali metal hydroxide compositions of copending application S.N. 636,544, the expansion of the heat storage material is extensive enough to almost entirely fill the storage module. As a result of this expansion, any gaseous material present in the expansion space at the top of the module is exhausted through a conventional breather pipe. However, by using a fluid piston, any gaseous material which would otherwise be exhaled from the module is merely forced into one side of the fluid container and the fluid is displaced toward the atmosphere. As the heat storage module or heat storage material cools and contracts, the fluid in the fluid piston is merely drawn toward the heat storage material. Of course, the fluid within the fluid piston must be of a type which will not react with the heat storage material or in any other way adversely contaminate it during the period of contraction. Likewise, the device containing the fluid of the fluid piston must be so designed so that no danger of contaminating the heat storage material will occur. The fluid piston may be likened in essence to a popout safety device in the sense that if extreme pressures are created within the heat storage module the fluid piston may be so designed that the fluid will actually leave the piston and expose the heat storage compositions to the atmosphere relieving any internal pressures within the module. In this regard the fluid piston may be considered a constant pressure regulator.

By using the fluid piston concept of this invention in conjunction with alkali metal hydroxide heat storage compositions, any oxygen released by the reaction would be trapped within the storage module or fluid piston and would be available to drive the reaction in the reverse direction upon cooling. In this context, the introduction of an oxidizing agent into the alkali metal hydroxide storage composition to assist in the regeneration of sodium nitrate from sodium nitrite to prevent corrosion of the steel container may be dispensed with. More than one heat storage module may be connected to a single fluid piston, via manifold means if desired, for certain applications. Likewise, a fluid piston may be incorporated into the heat storage apparatus in any suitable manner. Rather than expose one side of the fluid in the fluid piston to the atmosphere, the fluid piston may be connected between the space above the heat storage material in the storage vessel and the heat transfer fluid conduit line in those applications where a heat transfer fluid is employed. In this context, when the pressure within the heat storage vessel is at a maximum, i.e., a molten heat storage material is in the fully expanded state, pressure will be exerted on the other end of the fluid against the heat transfer fluid thereby transferring fluid under pressure and changing the boiling point of the heat transfer fluid thereby delivering heat at a more rapid rate. In this conjunction, the fluid piston may take the place of a constant pressure expansion member connected to the heat exchange fluid conduit to maintain or regulate the pressure exerted on the heat exchange fluid.

Other attributes of the over all heat storage system of this invention relate more particularly to the vessel or container for the heat storage medium. The container for the heat storage medium may be, under normal conditions, composed of steel or preferably mild steel. It has been found advantageous to aluminize both the interior and the exterior of the steel container. If for any reason an adverse reaction may be contemplated between the type of heat storage material employed and aluminum, only the exterior of the steel vessel should be aluminized. In this regard, the use of an aqueous caustic heat storage system would present considerable problems in the sense that reaction with aluminum would produce undesirable contaminants in the vessel by producing large amounts of gaseous products. However, in an anhydrous alkali metal hydroxide heat storage composition there is no reaction with aluminum. Aluminum present on the exterior of the container would provide better conductance than is obtained through steel alone. This application of heat conductance through the container walls is especially applicable to space heating in those situations where air is passed directly over the exterior of the heat storage module.

In heat storage applications such as that involved in the heating of water for home use of in space heating applications where a heat storage module is only used during certain seasons of the year, metal parts of the apparatus are particularly susceptible to the corrosive effects of the atmosphere during periods when it is not in operation. Hence, it is an aspect of this invention to provide heat storage modules in which the metallic surfaces of the heat storage apparatus are phosphatized to prevent deleterious atmospheric effects upon the system during season periods. Phosphatizing like aluminizing discussed in the preceding paragraph, may be performed by any suitable method such as spraying, deposition, mechanical application.

Another aspect of the heat storage container resides in the type of insulation employed. Conventional insulation (mineral wool) is deposited around the entire heat storage module. Mineral wool has a temperature gradient of about 100° F. per inch. Hence, insulation required to protect the heat storage module in which heat is present at about 900° F. requires a very thick mineral wool insulation layer. This thick insulation layer may be reduced in depth by removing the conventional outer 2 inches of mineral wool and replacing it by Hetrofoam (highly chlorinated polyurethane foam) which is an excellent insulator at temperatures up to about 300° F. One inch of Hetrofoam may be used effectively to replace two inches of mineral wool to afford the same exterior temperature of about 100° F.

The various aspects of this invention may be understood by reference to the accompanying drawings.

Figure 1:
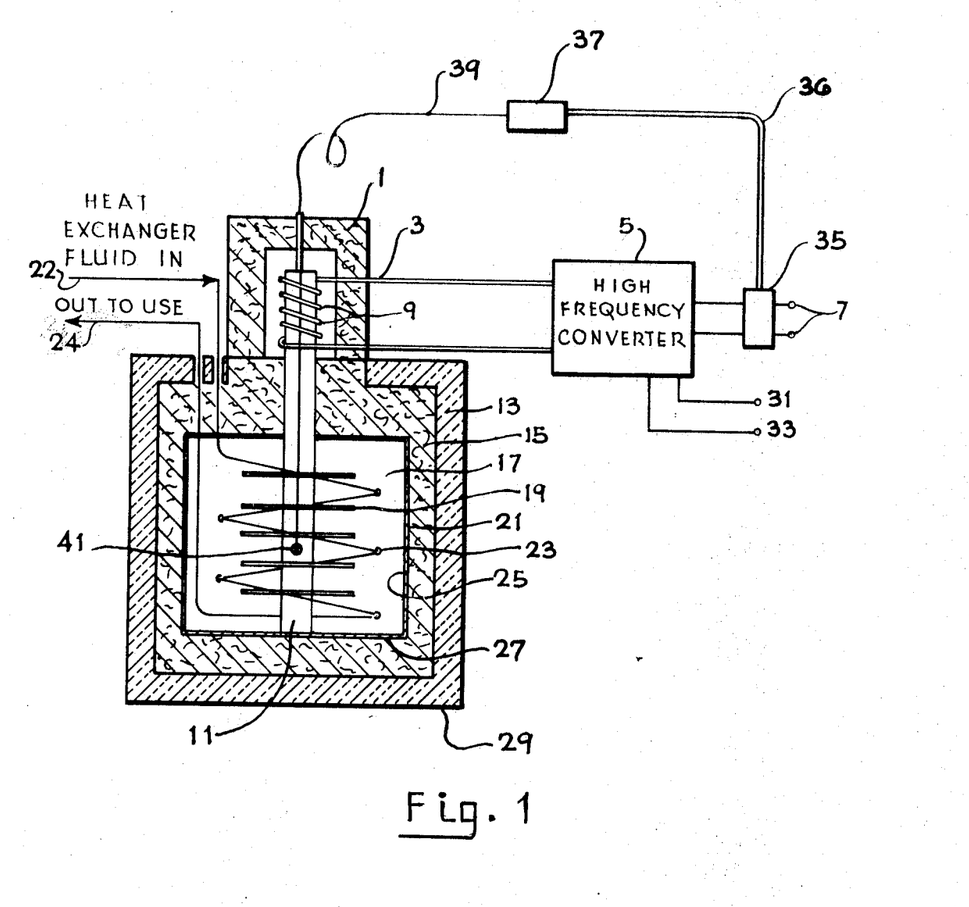
FIG. 1 represents a sectional view of a heat storage apparatus employing induction heating and conduction.

More specifically, the heat storage unit of FIG. 1 consists of a heat storage medium 17 within the heat storage container or crucible 21. Heater 11 is a metallic thermal conductor with either a solid or hollow core which conducts heat from the zone of induction coil 9 into the cooler heat storage material 17. Heater 11 is preferably equipped with heat conductive plates 19, which may be perforated and a thermocouple 41 which is preferably an Iron-Constantan or Chromel-Alumel couple. The thermocouple 41 serves to regulate heat input to the storage material via thermocouple lead wire 39 and the temperature limiting thermostat controller 37 which operates automatic switch 35 via lines 36.

A current supply 7 is connected to high frequency converter 5 which produces the desired electrical frequency for induction coil 9. Water cooled electrical conductor 3 supplied the current from the high frequency converter 5 to induction coil 9. The high frequency converter 5 may be equipped with a coolant system for conduction 3 via inlet 31 and exit 33. Where water is employed as the coolant and as a fluid to be heated, that water may be advantageously preheated by using it as the coolant for conductor 3 and subsequently fed to the heat storage material via heat exchange coil 23. Heat exchange coil 23 is provided with an inlet 22 and an outlet 24.

The container 21 for heat storage material 17 may be advantageously provided with an interior aluminized coating 25 to provide corrosion resistance. Furthermore, container 21 may be advantageously provided with an exterior aluminized or phosphatized corrosion resistant coating 27. The container 21 is surrounded by insulation 15 which is rock wool or a similar high temperature mineral insulation. Insulation 15 is made more effective by a layer of rigid highly chlorinated polyester resin foam insulation 13. An outer cover 29 serves to contain the complete heat storage module.

In the region of the induction coil 9, a high temperature insulation 1 is provided to insulate the hot zone of the induction coil.

Figure 2:
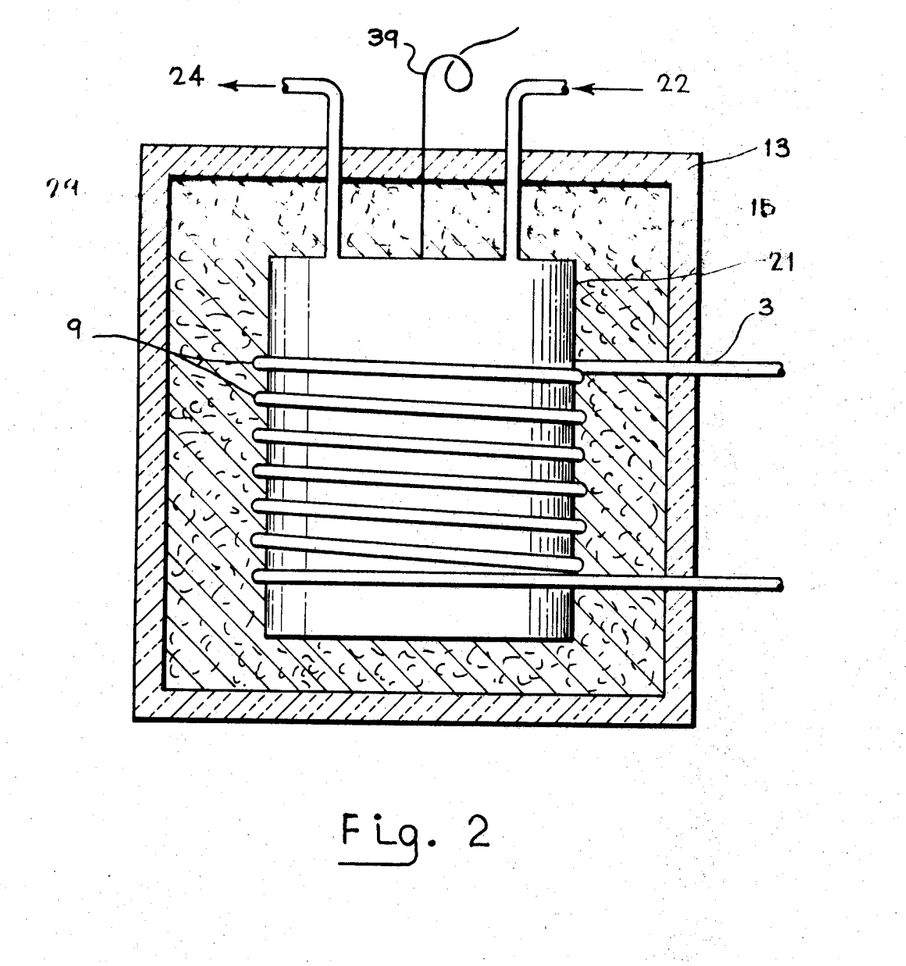
FIG. 2 represents a diagrammatic view of direct induction heating in which the container for the heat storage composition acts as the heater.

In FIG. 2, an induction heating coil 9 is employed to introduce heat directly into heat storage material. Hence, high frequency electrical current is conducted to coil 9 via conductor 3. The container 21 for the heat storage composition serves as the heater. Likewise, any magnetic metal within the heat storage container 21 will act as a heater. The container 21 is surrounded by insulation 15 and 13 which is within cover 29. The thermocouple lead wire connects the thermocouple (not shown) with a temperature limiting thermostat controller (not shown). The fluid to be heated is introduced into the heat exchange relationship with the heat storage media via conduit 22 and it exits the unit via outlet 24.

Figure 3:
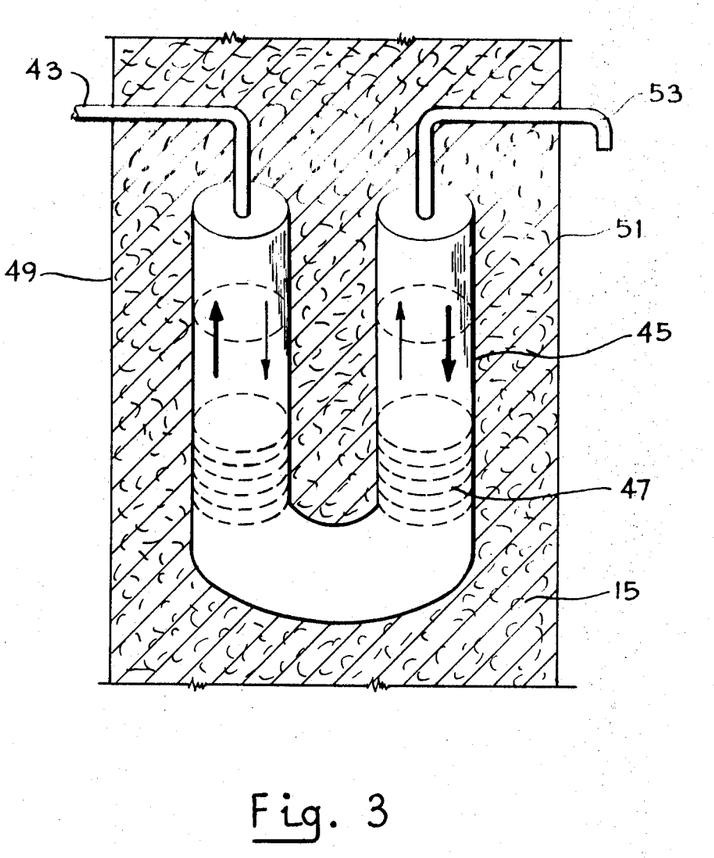
FIG. 3 represents a sectional view of a vent sealing means aspect of this invention.

The vent sealing means of FIG. 3 presents a fluid piston device which is connected via conduit 43 to the expansion space above an expandable heat storage material contained by one or more heat storage modules. The vent sealing means 45 is a tube containing a high temperature fluid, such as orthodichlorobenzene 47. In operation pre-dried air from the heat storage modules is prevented from escaping the unit during expansion of the heat storage material and the storage material is kept out of contact by the carbon dioxide and water of the atmosphere by fluid 47. As shown in FIG. 3, the vent sealing means is disposed in insulation 15 between the inner insulation wall 49 which contacts the heat storage container wall and the outer insulation wall 51 which abuts the cover for a complete storage unit. The fluid 47 is exposed to the atmosphere via conduit 53.

Figure 4:
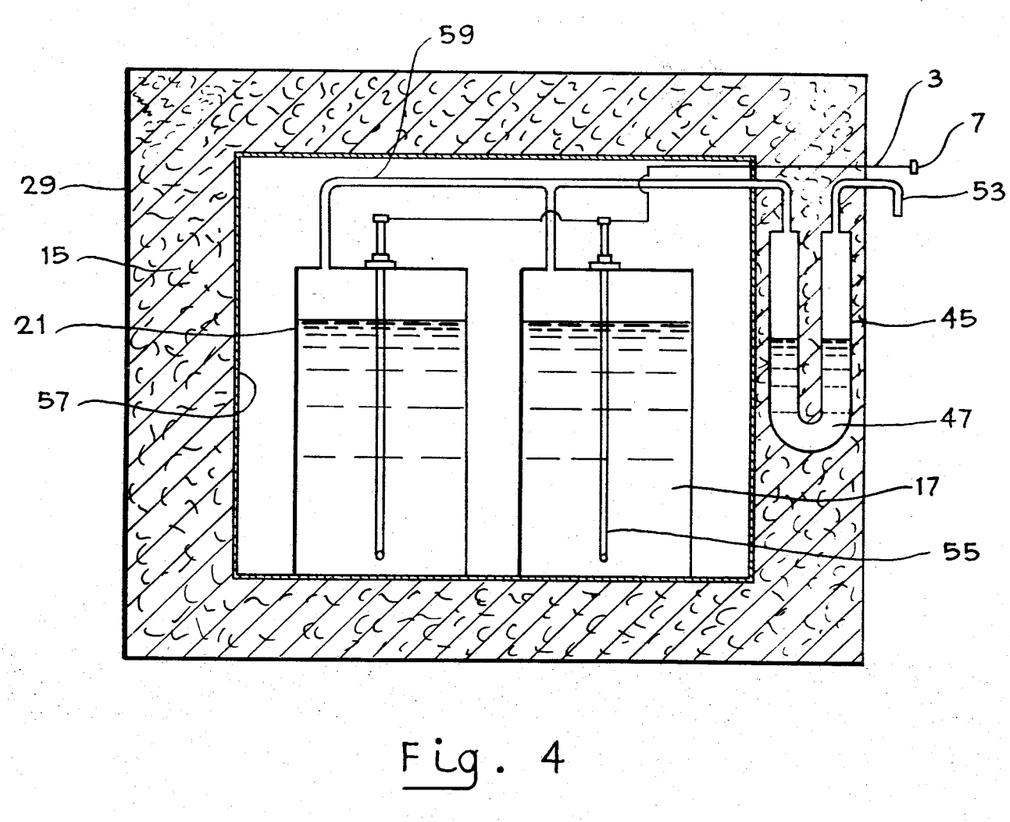
FIG. 4 represents a sectional side elevation of a heat storage unit in which the vent sealing means of FIG. 3 is employed.

FIG. 4 represents a specific application for the vent sealing device of FIG. 3 in the form of a heat storage unit housing plural heat storage vessels 21 partially filled with an expandable heat storage material 17. The unit is housed in container 57 which is surrounded by insulation 15 and cover 29. Electrical energy from power source 7 is conducted to electrical resistance heaters 55 via electrical conductor 3. Resistance heaters 55, submerged in heat storage material 17, melt the material causing it to expand. Manifold 59 connects the expansion space of each container 21 to the vent sealing means 45. The expansion of heat storage material causes the fluid 47 in the fluid piston 45 to rise against the atmospheric pressure on the exterior conduit 53 of the fluid piston thereby relieving pressure inside the individual modules and preventing an influx of atmospheric air upon cooling and contraction of the heat storage medium.

Figure 5:
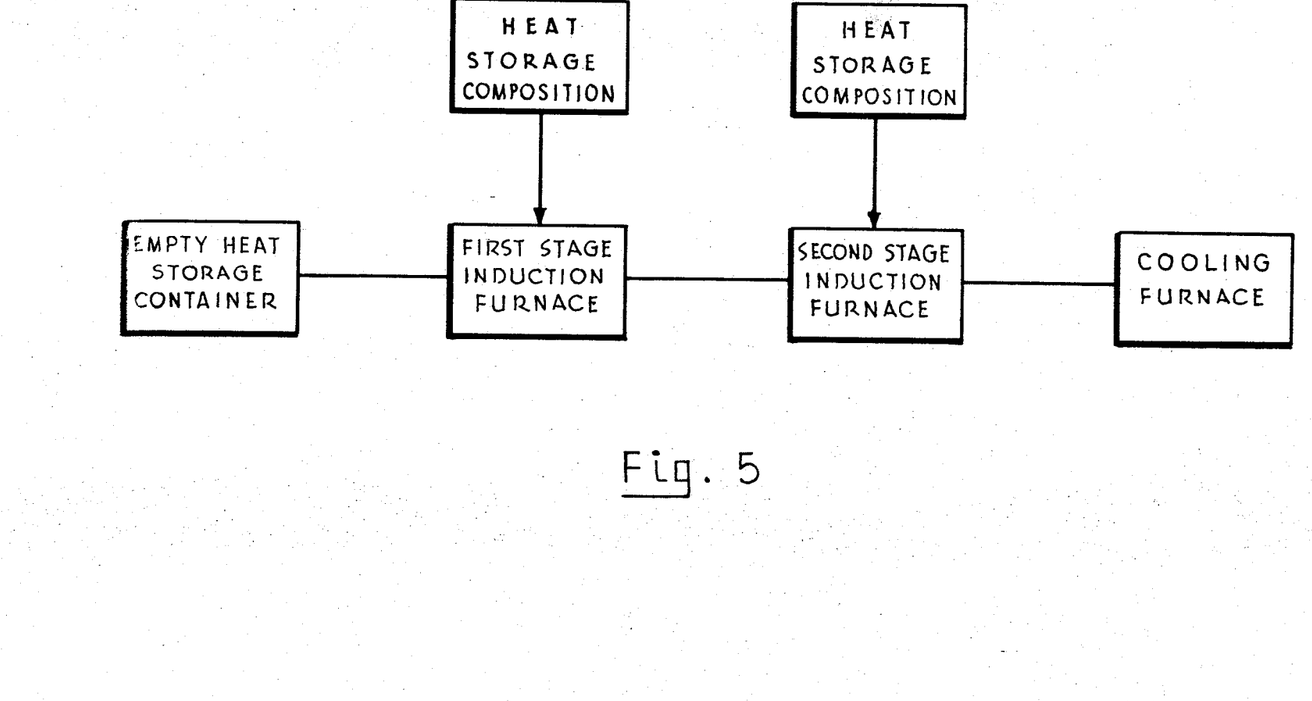
FIG. 5 is a flow diagram illustrating the method by which induction heating may be employed to fill heat storage modules.

Induction heating is advantageously employed during the operation of filling individual heat storage modules in the manner exemplified by FIG. 5. Empty containers for a heat storage composition which is cycled through a fused or melted state in use are placed in an induction furnace. The heat storage material is introduced into the container in solid state. The material is melted and passed to a second stage filling depot wherein additional heat storage material is added to obtain the desired amount of material in the container. The filled containers are then passed to a cooling zone in which cooling is preferably regulated to obtain a uniform density or homogeneity of heat storage material within each container.

Example 1

A heat storage system, constructed in accordance with FIG. 2 of the drawings is used for the heating of water. The heat storage apparatus comprises 1380 pounds of a substantially anhydrous alkali metal hydroxide composition comprising about 89 percent sodium hydroxide, about 8 percent sodium nitrate and about 0.5 percent manganese dioxide, the remainder being primarily sodium chloride, about 0.1 percent KOH and a small amount of sodium carbonate. The heat storage capacity of this composition is about 550,000 British thermal units (B.t.u.'s) at a charged temperature of about 900 degrees Fahrenheit. This corresponds to a heat storage density of about 400 B.t.u.'s per pound of heat storage composition or about 43,500 B.t.u.'s per cubic foot. Based on a 70 degree temperature rise, the storage capacity of the composition is about 10 times that of an identical volume of water.

The heat storage material is retained in a mild steel container having a coiled vaporizer passage therein with an inlet means at the bottom and an outlet means at the top thereof. Also contained in the heat storage container are mild steel heat conductors. The heat storage container is insulated with mineral wool and an outer covering of a highly chlorinated polyurethane foam insulation to minimize heat loss to the atmosphere. A water cooled induction heater coil is disposed exterior to the heat storage container.

Connected to the outlet of the vaporizer passage within the heat storage composition is a conduit passing to a second container for water. The conduit is connected to a coiled condenser within the water container. A conduit is provided to return condensed liquid to the inlet end of the vaporizer passage within the heat storage composition. A pump supplies the vaporizer passage within the heat storage medium with heat exchange fluid. Water is used as a heat exchange fluid.

The system is operated by passing water at a temperature of about 70 degrees Fahrenheit to the heat storage apparatus having an initial heat storage temperature of about 900 degrees Fahrenheit supplied to the storage composition by the high frequency induction coil. Water is vaporized while passing through the heat storage apparatus. On continued use, the temperature of the heat storage composition decreases to a preset temperature (600° F.) at which time the induction coil is re-energized to replace the heat loss. The induction coil is deactivated when the temperature of the heat storage composition again reaches 900° F. The steam is passed to the condenser in the water container wherein it condenses giving up its latent heat of vaporization, thereby heating the water in the water container. The condensed water is withdrawn from the condenser and passed to a reservoir for recycle to the heat storage apparatus.

Example 2

Utilizing the system described in Example 1, the heat storage and heat transfer characteristics are determined under various load demands. These tests substantiate a heat exchange rate for the described system capable of heating 250 gallons of water per hour over a 100 degrees Fahrenheit temperature rise for a period of at least two hours before the heating rate begins to lessen.

Example 3

An empty container for the heat storage composition of Example 1 is placed in an induction furnace. The high frequency induction coil is energized to heat the mild steel container to approximately 560 degrees Fahrenheit at which time the flaked heat storage composition is introduced into the container. The heat storage composition fuses; the liquid volume being less than that of the solid, additional flaked composition is added and fused to provide a pre-determined free board. The power input to the induction coil is slowly decreased by means of a voltage regulator. As the power input decreases slowly, the heat storage composition uniformly cools. No apparent distortion of the container occurs at it is cooled to room temperature. The power input to the coil reaches zero as the temperature of the container and composition approaches an ambient temperature.

Example 4

A thin walled mild steel container having a coiled vaporizer passage therein with an inlet means at the bottom and an outlet means at the top is placed in a high frequency induction furnace capable of producing a comparatively weak magnetic field at from 360 to 2000 cycles per second. A heat storage composition comprising a major amount of sodium hydroxide (more than about 85 percent by weight), a minor amount of sodium nitrate (from about 5 percent to about 15 percent by weight) and a minor amount of manganese dioxide (from about 0.1 to about 8 percent by weight) as well as very small amounts of impurities such as sodium chloride, sodium carbonate and potassium hydroxide, is introduced into the mild steel container. The induction coil is energized. The mild steel of the container becomes sufficiently heated to melt the solid heat storage material in the range of 560 to 600° F. The partially filled container is transferred to a second induction furnace which is provided with an induction coil energized by alternating high frequency electrical current sufficient to maintain the composition in liquid state. To the liquefied heat storage composition, there is added more solid heat storage composition to raise the level of the liquid contents of the container to a point sufficiently below the top of the container to provide adequate expansion space for subsequent heating and cooling cycles. The thusly filled container is removed to a cooling zone where the entire module is allowed to cool slowly to prevent puckering or distortion of the container walls. The container is closed at the top and installed in a heat storage unit equipped with an induction coil heating device for use.

The foregoing examples illustrate the applicability of induction heating of heat storage compositions. This method of introducing heat into a composition is applicable to all of the disclosed compositions in the same manner as is exemplified for the described alkali metal hydroxide composition. Of course the solid heat storage materials are not brorght up to a temperature at which they melt.

While there have been described various embodiments of the present invention, the specific examples are understood to be exemplary rather than limitations on the scope of the invention. Having disclosed the invention, various modifications thereof will be obvious to one of average skill in this art which do not depart from the true scope of this contribution.

What is claimed is:

1. A heating system comprising a container housing a thermally stable heat storage material comprising a substantially anhydrous alkali metal hydroxide composition, conduit means for conducting a heat transfer medium into heat transfer relationship with said heat storage material and into heat exchange relationship with the object to be heated and heating means for introducing heat into said heat storage material, and a hermetic sealing means in communication with the interior of said container.

2. The system of claim 1 in which the hermetic sealing means is a fluid piston.

3. The heating system of claim 1 in which the outer surface of said container is aluminized.

4. The heating system of claim 3 in which the inner surface of said container is aluminized.

5. The heating system of claim 1 in which the outer surface of said container is phosphatized.

6. The heating system of claim 1 in which the container for said heat storage material is insulated externally with a mineral wool insulation and an outer layer of highly chlorinated polyurethane foam.

7. The system of claim 1 in which said heating means comprises the container for said heat storage material activated to produce heat by molecular excitation induced by a high frequency induction coil

References Cited

UNITED STATES PATENTS

| | | | |
|---|---|---|---|
| 1,415,457 | 5/1922 | Lauth | 219—10.51 |
| 2,407,562 | 9/1946 | Lofgren | 219—10.51 |
| 2,513,779 | 7/1950 | Bailey | 219—10.51 |
| 3,053,959 | 9/1962 | Christmann | 219—10.49 |
| 3,400,249 | 9/1968 | Mekjean et al. | 219—378 |
| 2,911,513 | 11/1959 | MacCracken | 219—326 |
| 3,356,828 | 12/1967 | Furness | 219—365 |

FOREIGN PATENTS 471,505  12/1935  Great Britain.

JOSEPH U. TRUHE, Primary Examiner

L. H. BENDER, Assistant Examiner

U.S. Cl. X.R.

219—10.51, 365

PO-1050
(5/69)

UNITED STATES PATENT OFFICE
CERTIFICATE OF CORRECTION

Patent No. 3,517,151                    Dated  June 23, 1970

Inventor(s)  Matthew Mekjean

It is certified that error appears in the above-identified patent and that said Letters Patent are hereby corrected as shown below:

Column 6, line 63 of Table, last column, delete "0.647(s)0, and insert --- 0.647(s).

Column 6, line 64 of Table, last column, delete "0.6, and insert -- 0.60;

Column 16, line 72, delete "occurs at", and insert -- occurs as --.

SIGNED AND
SEALED
DEC 15 1970

(SEAL)
Attest:

Edward M. Fletcher, Jr.
Attesting Officer

WILLIAM E. SCHUYLER, JR.
Commissioner of Patents